(12) United States Patent
Husemann et al.

(10) Patent No.: US 8,845,846 B2
(45) Date of Patent: Sep. 30, 2014

(54) PRESSURE-SENSITIVE ADHESIVE MASS

(71) Applicant: tesa SE, Hamburg (DE)

(72) Inventors: Marc Husemann, Hamburg (DE); Thorsten Krawinkel, Hamburg (DE); Daniel Klier, Reinbek (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 13/865,539

(22) Filed: Apr. 18, 2013

(65) Prior Publication Data

US 2013/0245178 A1 Sep. 19, 2013

Related U.S. Application Data

(62) Division of application No. 12/995,393, filed as application No. PCT/EP2009/066497 on Dec. 7, 2009, now abandoned.

(30) Foreign Application Priority Data

Dec. 15, 2008 (DE) .......... 10 2008 061 840

(51) Int. Cl.
*C09J 153/00* (2006.01)
*C08K 5/07* (2006.01)

(52) U.S. Cl.
USPC ....................... 156/306.6; 524/357

(58) Field of Classification Search
USPC ....................... 156/306.6; 524/357
See application file for complete search history.

(56) References Cited

U.S. PATENT DOCUMENTS

| | | | |
|---|---|---|---|
| 3,970,608 A | 7/1976 | Furukawa et al. | |
| 6,653,408 B1 | 11/2003 | Clair | |
| 6,703,463 B2 | 3/2004 | Holguin et al. | |
| 7,807,730 B2 | 10/2010 | Bissinger et al. | |
| 2002/0098352 A1 | 7/2002 | Kishioka | |
| 2007/0270553 A1* | 11/2007 | Bohm et al. | 525/314 |
| 2007/0275240 A1 | 11/2007 | Krawinkel | |
| 2008/0090036 A1 | 4/2008 | Hiruma et al. | |
| 2010/0012271 A1 | 1/2010 | Krawinkel | |

FOREIGN PATENT DOCUMENTS

| | | |
|---|---|---|
| DE | 10361540 A1 | 7/2005 |
| DE | 102006023936 A1 | 11/2007 |
| DE | 102006047738 A1 | 4/2008 |
| EP | 1 211 298 A2 | 6/2002 |
| EP | 1 652 889 A1 | 5/2006 |
| EP | 1 857 515 A2 | 11/2007 |
| JP | 09157599 A | 6/1997 |
| JP | 2002 363523 A | 12/2002 |
| WO | 01 92344 A2 | 12/2001 |

OTHER PUBLICATIONS

International Search Report of corresponding PCT Application No. PCT/EP2009/066497 dated Mar. 11, 2010.
Non-English German Search Report of corresponding DE Application No. 10 2008 061 840.3 dated Sep. 23, 2009.

* cited by examiner

*Primary Examiner* — Robert D. Harlan
(74) *Attorney, Agent, or Firm* — Norris McLaughlin & Marcus, P.A.

(57) ABSTRACT

A method and an adhesive bond optical components, such that a first optical component is bonded to a second optical component with the adhesive, wherein the adhesive comprises at least an acid anhydride-modified vinylaromatic block copolymer, a metal chelate, and a tackifier resin, and the adhesive has a transmittance of greater than 86% and a haze of less than 5%.

20 Claims, 2 Drawing Sheets

PRESSURE-SENSITIVE ADHESIVE MASS

Figure 1:
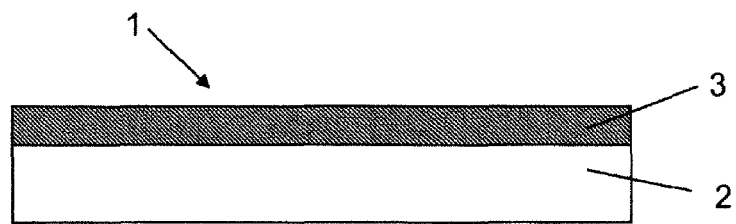

The present application is a divisional of U.S. patent application Ser. No. 12/995,393, filed Nov. 30, 2010, which is a 371 of PCT/EP2009/066497, filed 7 Dec. 2009 (international filing date), and which claims the priority of German Application No. 10 2008 061 840.3, filed on 15 Dec. 2008.

The present invention relates to the use of a pressure-sensitive adhesive (PSA) for bonding optical components, more particularly optical films, as claimed in claim 1.

The uses of PSAs are nowadays very diverse. In the industrial sector, accordingly, there exist a very wide variety of applications. Adhesive tapes based on PSAs are used in particularly high numbers in the electronics segment or in the consumer electronics segment. Owing to the high numbers of units, pressure-sensitive adhesive tapes can be deployed here very rapidly and easily, meaning that other operations, such as riveting or welding, for example, would be too costly and complicated. Besides their normal joining function, these pressure-sensitive adhesive tapes may be required to take on additional functions. Examples thereof might include thermal conductivity, electrical conductivity or else an optical function. In the latter case, for example, pressure-sensitive adhesive tapes are used which have light-absorbing or light-reflecting functions. Another optical function, for example, is a suitable light transmittance. Here, pressure-sensitive adhesive tapes and PSAs are used that are very transparent, have no intrinsic coloration, and also possess a high light stability. Areas of application are, for example, the bonding of touch panels to an LCD or OLED display, or the bonding of ITO films (indium tin oxide) for capacative touch panels.

In many cases, a PSA for optical purposes, as well as the joining function, has the function of excluding air, since air has a refractive index of 1 and the optical films or glasses have a refractive index which is generally much larger. On transition from air to the optical component, the difference in refractive indices leads to reflection, which reduces the transmission. One way of solving this problem is provided by anti-reflection coatings, which facilitate the transition of the light into the optical component, and reduce reflection. An alternative or additional option is to use an optical PSA with a refractive index similar to that of the optical component. This significantly minimizes the reflection from the optical component, and increases the transmission. Optical components, such as films or glasses, generally have a relatively high refractive index, and so there is a need for PSAs with likewise a high refractive index. The majority of substrates to be bonded for optical purposes have a refractive index in the range from about 1.45 to about 1.70.

Known overall are, for example, a large number of acrylate PSAs which have very different refractive indices. U.S. Pat. No. 6,703,463 B2 describes acrylate PSAs with a refractive index of below 1.40. This is achieved by fluorinated acrylate monomers. The fractive index is well below the required range. JP 2002-363523 A discloses acrylate PSAs having a refractive index of between 1.40 and 1.46. Here again, fluorinated acrylate monomers are used. The refractive index is still well below the required range. Available commercially, moreover, are pressure-sensitive adhesive acrylate tapes, such as 3M 8141, for example, having a refractive index in the range from 1.47 to 1.48. US 2002/0098352 A1 in turn describes acrylate PSAs with aromatic comonomers. These acrylate PSAs have a refractive index of 1.49-1.65. EP 1 652 889 A1 describes PSA formulations for optical applications that are based on polydiorganosiloxanes. Silicone compounds, however, generally have a low refractive index, and so the PSAs described are not very suitable as optical PSAs.

Accordingly there still exists a need for an improved optical pressure-sensitive adhesive which has a high refractive index. An optical PSA of this kind ought further to have a high transmittance and to possess high UV stability.

The present invention solves the above-described problem through the use of an adhesive as claimed in claim 1. Preferred embodiments and developments are subject matter of the respective subclaims.

In accordance with the invention it has been recognized that a mixture at least comprising
   an acid anhydride-modified vinylaromatic block copolymer
   a metal chelate, and
   at least one tackifier resin
produces a suitable adhesive for use for the bonding of optical components. As a result of the constituents identified above it is possible to obtain an adhesive, more particularly a PSA, which permits a light transmittance of more than 86% and also a haze of less than 5% in accordance with ASTM D 1003. Hence this adhesive is suitable for the bonding of optical components, and in particular for their full-area bonding too.

Additionally to the base constituents identified above, the adhesive of the invention may also comprise further constituents. In addition, it is not absolutely necessary, although preferred, for all of the vinylaromatic block copolymers present to be acid anhydride-modified. The fraction of the acid-modified vinylaromatic block copolymers ought, however, not to be below 40% of the vinylaromatic block copolymers.

The adhesive of the invention has in particular a fraction of at least 30%, preferably at least 35%, by weight of acid anhydride-modified vinylaromatic block copolymer. The fraction thereof ought not to exceed the threshold of 70%, preferably of 60%, by weight.

The fraction of the metal chelates in the adhesive is preferably 0.01% to 2%, more preferably 0.1% to 1%, by weight. The fraction of tackifier resin, in turn, is preferably 20% to 70%, more preferably 30% to 60% by weight. This fraction of tackifier resin may be obtained by means of a single tackifier resin; it is also possible, however, to use mixtures of different tackifier resins.

In the design and configuration of optical components it is necessary to give consideration to the interaction of the materials used with the nature of the irradiated light. In one derived version, the law of conservation of energy takes on the following form:

$$T(\lambda)+p(\lambda)+a(\lambda)=1 \tag{1}$$

where
   $T(\lambda)$=fraction of light transmitted
   $p(\lambda)$=fraction of light reflected
   $a(\lambda)$=fraction of light absorbed
   $\lambda$=wavelength,
the overall intensity of the irradiated light being standardized to 1.

Depending on the application of the optical component, it is appropriate to optimize single terms out of these three terms from formula (1) and to suppress the others. Optical components designed for transmittance ought to have values for the transmittance $T(\lambda)$ that are close to 1. This is achieved when the fraction of reflected light $p(\lambda)$ and the fraction of absorbed light $a(\lambda)$ are reduced in their amount as far as possible. PSAs based on synthetic rubber normally have no significant absorption in the visible range, i.e., in the wavelength range between 400 nm and 700 nm. This can be easily verified by measurements with a UV-Vis spectrophotometer. Critical interest therefore attaches to $p(\lambda)$. Reflection is an interface phenomenon which is dependent on the refractive indices $n_{d,i}$ of two phases i that are in contact, in accordance with the Fresnel equation:

$$\rho(\lambda) = \left(\frac{n_{d,2} - n_{d,1}}{n_{d,2} + n_{d,1}}\right)^2 \quad (2)$$

For the case of isorefractive materials, for which $n_{d,2}=n_{d,1}$, $\rho(\lambda)=0$. This explains the need to adapt the refractive index of a PSA for use for optical components to that of the materials that are to be bonded. Typical values for the refractive index of various materials used for optical components are set out in table 1.

TABLE 1

| Material | Refractive index $n_d$ |
|---|---|
| Quartz glass | 1.458 |
| Borosilicate crown (BK7) | 1.514 |
| Borosilicate crown | 1.518 |
| Flint | 1.620 |

(Source: Pedrotti, Pedrotti, Bausch, Schmidt, Optik, 1996, Prentice-Hall, Munich. Data for X = 588 nm)

Adhesive

As already described above, the adhesive, more particularly as a PSA, is based on a mixture of acid anhydride-modified vinylaromatic block copolymer, metal chelate, and at least one tackifier resin.

The adhesive comprises as acid anhydride-modified vinylaromatic block copolymer preferably such based on block copolymers comprising polymer blocks formed of vinylaromatics (A blocks) and at least one of the following B blocks:
1. Blocks from polymerization of 1,3-dienes
2. Blocks from polyisoprene
3. Blocks from mixtures of 1,3-dienes and vinylaromatics, the vinylaromatic fraction in the B blocks not exceeding 50%
4. Mixtures of 1,3-dienes and polyisobutylene.

Both homopolymer and copolymer blocks can be utilized in accordance with the invention. Resultant block copolymers may comprise identical or different B blocks. The block copolymers are preferably partly, selectively or fully hydrogenated. Block copolymers may have linear A-B-A structure. Likewise possible for use are block copolymers of radial architecture, and also star-shaped and linear multiblock copolymers. Further components present may include A-B diblock copolymers. All of the aforementioned polymers may be utilized alone or in a mixture with one another. Through the vinylaromatic fraction, which for the block copolymers employed lies between 10% and 50% by weight, it is possible to control the refractive index of the PSA. Hence the refractive index increases with increasing aromatic fraction.

At least some of the block copolymers used are acid- or acid anhydride-modified, the modification taking place primarily through radical graft copolymerization of unsaturated monocarboxylic and polycarboxylic anhydrides, such as maleic anhydride, itaconic anhydride or citraconic anhydride, for example, preferably maleic anhydride. The fraction of the acid anhydride is preferably between 0.5% and 4% by weight, based on the overall block copolymer. With a fraction of less than 0.5% by weight, a sufficient effect is not reliably ensured, while a fraction higher than 4% by weight cannot readily be grafted on.

Commercially, such block copolymers are available, for example, under the name Kraton FG 1901 and Kraton FG 1924 from Kraton, and Tuftec M 1913 and Tuftec M 1943 from Asahi.

The adhesive, more particularly as a pressure-sensitive adhesive, preferably has a fraction of 20% to 70% by weight of vinylaromatic block copolymer, preferably of 30% to 60% by weight, and more preferably of 35% to 55% by weight. The entire fraction of block copolymers need not be anhydride- or acid-modified. If the elastomeric fraction is higher or lower, the adhesive is not pressure-sensitively adhesive in every case.

Besides the aforementioned acid anhydride-modified vinylaromatic block copolymers, it is also possible for further acid anhydrides to be added, in order to achieve a higher degree of crosslinking and hence a further-improved cohesion. In this context it is possible to use not only monomeric acid anhydrides, as described in U.S. Pat. No. 3,970,608 A, for example, but also acid anhydride-modified polymers and/or acid anhydride-containing copolymers such as polyvinyl methyl ether-maleic anhydride copolymers, obtainable, for example, under the name Gantrez, sold by ISP.

As tackifier, the described adhesive, more particularly the PSA, utilizes as a main component, in particular, tackifier resins which are compatible with the elastomer block of the vinylaromatic block copolymers. The fraction of these compatible resins ought to account in total for at least 50% by weight of the tackifier resins. Preferential suitability is possessed inter alia by unhydrogenated, partially hydrogenated or fully hydrogenated resins based on rosin and rosin derivatives, by hydrogenated polymers of dicyclopentadiene, by unhydrogenated or partially, selectively or fully hydrogenated hydrocarbon resins based on C-5, C-5/C-9 or C-9 monomer streams, by polyterpene resins based on α-pinene and/or β-pinene and/or δ-limonene, and by hydrogenated polymers of preferably pure C-8 and C-9 aromatics. Aforementioned tackifier resins may be used both alone and in a mixture. For use in the optical segment use is made in particular of those resins which are particularly colorless, i.e., preferably have a Gardner number of less than 2, ideally hydrogenated hydrocarbon resins based on C5, C5/C9 or C9. The Gardner number is determined at 50% strength in toluene.

The (pressure-sensitive) adhesive may comprise, moreover, a large number of further blending components for the purpose of setting specific properties. Further additives that may typically be utilized include the following:
  primary antioxidants, such as sterically hindered phenols, for example
  secondary antioxidants, such as phosphites or thioethers, for example
  in-process stabilizers, such as C radical scavengers, for example
  light stabilizers, such as UV absorbers or sterically hindered amines, for example
  processing assistants
  endblock reinforcer resins
  fillers, such as, for example, silicon dioxide, glass (ground or in the form of beads), aluminum oxides or zinc oxides, the fillers being ground to a sufficiently small size that they are optically invisible
  if desired, further polymers of preferably elastomeric kind; elastomers that can be utilized accordingly include, among others, those based on pure hydrocarbons, examples being unsaturated polydienes, such as natural or synthetically produced polyisoprene or polybutadiene, elastomers with substantial chemical saturation, such as saturated ethylene-propylene copolymers, for example, α-olefin copolymers, polyisobutylene, butyl rubber, ethylene-propylene rubber, and also chemically functionalized hydrocarbons, such as halogen-containing, acrylate-containing or vinyl ether-containing polyolefins, for example, to name but a very few.

Plasticizing agents, such as, for example, liquid resins, plasticizer oils or low molecular mass liquid polymers, such as, for example, low molelcular mass polybutenes having molar masses<1500 g/mol (number average)

The adhesive may be one which is already in pressure-sensitively adhesive form, i.e., requires no further activation. Optionally, however, it may be the case that the pressure-sensitive adhesiveness of the adhesive is brought about only through activation, such as a thermal activation or a solvent activation. The modification of the pressure-sensitive adhesiveness is dependent in particular on the fraction of tackifier resins and also on the elastomer-to-resin ratio.

The metals of the metal chelates are those from main groups 2, 3, 4 and/or 5 of the Periodic Table and/or the transition metals. Particularly suitable are aluminum, tin, titanium, zirconium, hafnium, vanadium, niobium, chromium, manganese, iron, cobalt, and cerium. Particularly preferred is aluminum.

The metal chelates are reproduced by the following formula:

$$(R_1O)_nM(XR_2Y)_m \qquad (3)$$

where
M is a metal as described above,
$R_1$ is an alkyl or aryl group, more particularly methyl, ethyl, butyl, isopropyl or benzyl,
n is zero or an integer greater than zero (n≥0),
X is oxygen or nitrogen,
Y is oxygen or nitrogen,
where X=Y is also possible and where X and/or Y may be bonded to $R_2$ by a double bond;
$R_2$ is an alkylene group joining X and Y, where the alkylene group may be branched, or else may contain oxygen and/or further heteroatoms in the chain;
m is an integer, that is at least 1 (m≥1).

Preferred chelate ligands (corresponding, therefore, to the following formula: $(XR_2Y)_m$) are those formed from the reaction of the following compounds: triethanolamine, 2,4-pentanedione, 2-ethyl-1,3-hexane-diol or lactic acid. Particularly preferred crosslinkers are aluminum acetylacetonates.

In this context, an approximately equivalent ratio between the acid anhydride groups of the elastomer, in other words of the acid anhydride-modified vinylaromatic block copolymer, and the acetylacetonate groups of the metal chelate ought to be selected, in order to achieve optimum crosslinking, with a small excess of crosslinker having emerged as being positive. Complex-type bonding between the acid anhydride groups and the acetylacetonate groups results in the desired crosslinking. Also, however, the ratio between anhydride groups and acetylacetonate groups can be varied, but for sufficient crosslinking neither of the two groups ought to be present in more than a fivefold molar excess.

As a result of the crosslinking with the metal chelates, the block copolymer compositions do not soften even at relatively moderate temperatures, but instead withstand intact the customary operations at up to 85° C. climatic cycling temperature. Climatic cycling temperature refers in the present case to a repeated change in temperature, more particularly in a temperature range from −40° C. to 85° C.

A further requirement of a (pressure-sensitive) adhesive for optical use is its neutrality, in other words a pH of between pH 6 and pH 8. Hence an optical adhesive ought not to contain any acid functions, which on contact with ITO films, for example, may negatively influence the electrical conductivity over a prolonged time period. Surprisingly, the above-described (pressure-sensitive) adhesive has specifically proven suitable for not disproportionately disrupting the electrical conductivity, despite containing acid functions. In adhesive bonding to electrically conductive substrates, the behavior of the adhesive is inert. The adhesive can therefore be used also, in particular, for the bonding of ITO films in touch panels. Its pH is situated in particular in the range from pH 6 to pH 8.

As already elucidated above, there are particular requirements of optical adhesives in terms of their light stability. In order to meet these requirements, light stabilizers in particular are added to the (pressure-sensitive) adhesive. The addition of light stabilizers is made more particularly at a fraction from 0.1% to 2% by weight.

Light stabilizers selected are preferably substituted triazines. The triazines are selected such that they have high compatibility with the synthetic rubber adhesives. This is achieved, for example, through substituents. Thus, preferred embodiments of the triazines have at least one aromatic substituent. It is preferred to employ triazines having precisely 2 aromatic substituents, very preferably having precisely 3 aromatic substituents. These aromatics may themselves be substituted in turn by at least one aliphatic substituent. In its simplest form this may be a methyl group. Use may also be made, however, of other substituents, such as hydroxyl groups, ether groups, aliphatic chains having 2 to 20 C atoms, which may be linear, branched or cyclic and may also contain 1 to 5 O atoms in the form of ether groups, hydroxyl groups, ester groups and/or carbonate groups. Examples of substituted triazines of commercial nature are available from Ciba under the brand name Tinuvin®. Thus, for example, Tinuvin® 400, Tinuvin® 405, Tinuvin® 479, and Tinuvin® 477 are suitable triazines which can be used.

As light stabilizers, alternatively or additionally to the triazines, sterically hindered amines can be used. Particular preference is given to using substituted N-methylpiperidine derivatives. These are sterically hindered, for example, in position 1 and in position 5, by aliphatic groups, such as methyl groups, for example. It is particularly preferred to use four methyl groups for the steric hindrance. In order to achieve good solubility with the synthetic rubber adhesives and also in order to increase the evaporation temperature, long aliphatic substituents are used. The substituents may be linear, cyclic or branched. They may contain up to 20 C atoms and/or may contain up to 8 O atoms, in the form, for example, of ester groups, ether groups, carbonate groups or hydroxyl groups. For the effect it is possible to use compounds having only one N-methylpiperidine group. Also known, however, are dimeric N-methylpiperidine derivatives which have a light stabilizing function. These compounds may also be combined with the monomeric compounds.

As aging inhibitors it is preferred to use sterically hindered phenols. In one preferred embodiment, sterically hindered phenols have tert-butyl groups in both ortho-positions with respect to the hydroxyl group. In order to allow high solubility and a high evaporation temperature to be achieved, the sterically hindered phenols ought to have additional substitution. The substituents may be linear, cyclic or branched. They may contain up to 20 C atoms and/or up to 8 O atoms, in the form, for example, of ester groups, ether groups, carbonate groups or hydroxyl groups. Examples of commercially available compounds include Irganox® 1135 or Irganox® 1330 from Ciba. The fraction of aging inhibitors is preferably 0.1% to 2% by weight.

The combination of substituted phenols and aromatically substituted phosphites has emerged as being particularly advantageous. The substituted phenols ought preferably to be at least doubly substituted and to contain at least one sulfur atom in both substituents. Commercial examples of S-containing sterically hindered phenols are Irganox® 1520 or Irganox® 1726 from Ciba. Commercial examples of aromatically substituted phosphites are Irgafos® 168, Irgafos® 126, Irgafos® 38, Irgafos® P-EPQ or Irgafos® 12 from Ciba.

Figure 2:
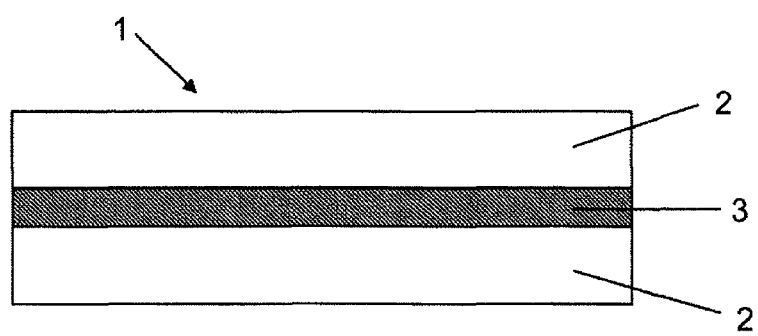
Figure 3:
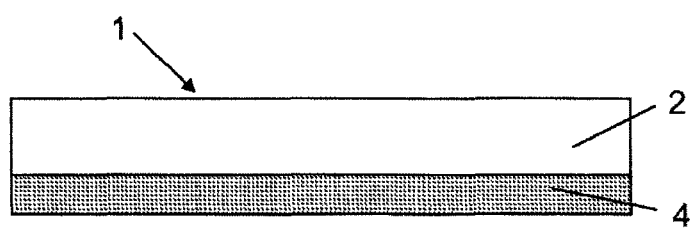
Figure 4:
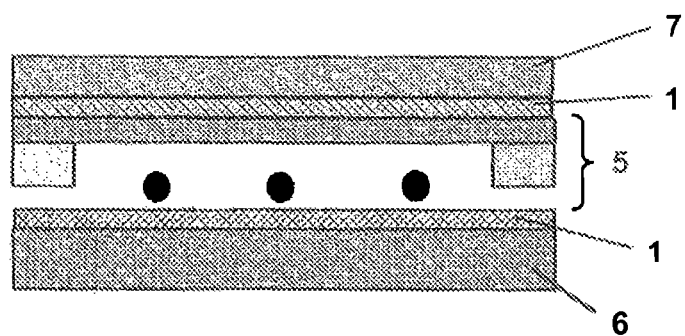
Figure 5:
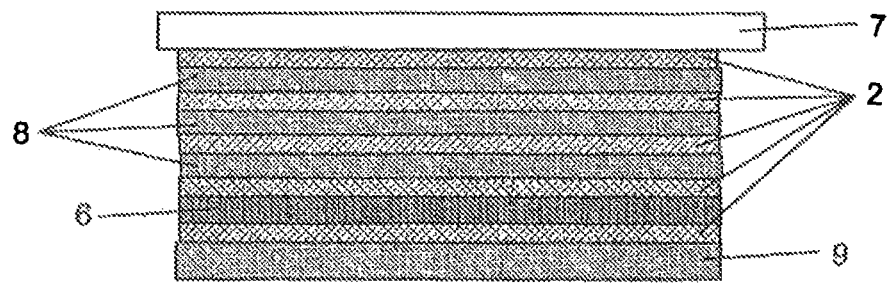

Further details, objectives, features, and advantages of the present invention will be elucidated in more detail below by reference to preferred exemplary embodiments. In the drawing, FIG. 1 shows a single-sided pressure-sensitive adhesive tape, FIG. 2 shows a double-sided pressure-sensitive adhesive tape, FIG. 3 shows a carrier-free pressure-sensitive adhesive tape (transfer tape), FIG. 4 shows the bonding of a rear reinforcement plate of a touch panel, FIG. 5 shows the bonding of different layers of a touch panel.

Product Construction

FIG. 1 shows a single-sided pressure-sensitive adhesive tape 1 for use in the bonding of optical components, more particularly of optical films. The pressure-sensitive adhesive tape 1 has an adhesive layer 2 produced by coating a PSA onto a carrier 3. The PSA coat weight is preferably between 5 and 250 $g/m^2$. The PSA is an adhesive formed from acid anhydride-modified vinylaromatic block copolymers, metal chelate, and a tackifer resin, as described above. The PSA has a transmittance of at least 86% in particular in the visible range of light, so making it particularly suitable for optical application.

For the application in the bonding of optical components, a transparent carrier 2 is also employed as carrier 2. The carrier 2 is therefore likewise transparent in the range of visible light, and hence preferably has a transmittance of—likewise—at least 86%.

Additionally provided (not shown) there may also be a release film which lines and protects the adhesive layer 2 prior to the use of the pressure-sensitive adhesive tape 1. The release film is then removed prior to the use of the adhesive layer 2.

The transparent PSA may preferably be protected with a release film. It is possible, furthermore, for the carrier film to be provided with one or more coatings. The PSA coat weight is preferably between 5 and 250 $g/m^2$.

The product construction depicted in FIG. 2 shows a pressure-sensitive adhesive tape 1 having a transparent carrier 3, which is coated on both sides with a PSA and thus has two adhesive layers 2. The PSA coat weight per side is again preferably between 5 and 250 $g/m^2$.

In this embodiment as well, it is preferred for at least one adhesive layer 2 to be lined with a release film. In the case of a rolled-up adhesive tape, this one release film may where appropriate also line the second adhesive layer 2. It is also possible, however, for a plurality of release films to be provided.

A further possibility is for the carrier film to be provided with one or more coatings. Moreover, only one side of the pressure-sensitive adhesive tape may be equipped with the inventive PSA, and a different transparent PSA may be used on the other side.

The product construction depicted in FIG. 3 shows a pressure-sensitive adhesive tape 1 in the form of a transfer tape, i.e., a carrier-free tape 1. For this purpose, the PSA is coated onto one side of a release film 4, and so forms a pressure-sensitive adhesive layer 2. The PSA coat weight is preferably between 5 and 250 $g/m^2$. Where appropriate, this pressure-sensitive adhesive layer 2 is also lined on its second side with a further release film. For the use of the pressure-sensitive adhesive tape, the release films are then removed.

As an alternative to release films it is also possible, for example, to use release papers or the like. In that case, however, the surface roughness of the release paper ought to be reduced, in order to produce a very smooth PSA side.

Carrier Films

As carrier films it is possible to use a large number of highly transparent polymer films. Special highly transparent PET films can be used in particular. Suitability is thus possessed, for example, by films from Mitsubishi with the trade name Hostaphan™ of from Toray with the trade name Lumirror™. The haze, a measure of the clouding of a substance, ought in one preferred embodiment to have a value of less than 5% in accordance with ASTM D 1003. High haze denotes low visibility through the substance in question. The light transmittance at 550 nm is preferably greater than 86%, more preferably greater than 88%. A further very preferred species of the polyesters is represented by the polybutylene terephthalate films.

Besides polyester films it is also possible to use highly transparent PVC films. These films may include plasticizers in order to increase the flexibility. Moreover, PC, PMMA, and PS films can be used. Besides pure polystyrene, it is also possible to use other comonomers, such as butadiene, for example, in addition to styrene, for the purpose of reducing the propensity to crystallization.

Moreover, polyethersulfone films and polysulfone films can be used as carrier materials. These films are obtainable, for example, from BASF under the tradename Ultrason™ E and Ultrason™ S. It is also possible, furthermore, with particular preference, to use highly transparent TPU films. These films are available commercially, for example, from Elastogran GmbH. Use may also be made of highly transparent polyamide films and copolyamide films, and also of films based on polyvinyl alcohol and polyvinyl butyral.

Besides single-layer films it is also possible to use multilayer films, which are produced by coextrusion, for example. For this purpose it is possible to combine the aforementioned polymer materials with one another.

The films, further, may be treated. Thus, for example, vapor deposition may be performed, with zinc oxide, for example, or else varnishes or adhesion promoters may be applied. One further possible additization is represented by UV protectants, which may be present as additives in the film or may be applied as a protective layer.

The film thickness in one preferred embodiment is between 4 µm and 150 µm, more preferably between 12 µm and 100 µm.

The carrier film may, for example, also have an optical coating. Particularly suitable optical coatings are coatings which reduce the reflection. This is achieved, for example, through a reduction in the refractive index difference for the air/optical coating transition.

Generally speaking, a distinction may be made between single-layer and multilayer coatings. In the simplest case, $MgF_2$ is used as a single layer to minimize the reflection. $MgF_2$ has a refractive index of 1.35 at 550 nm. Furthermore, for example, metal oxide layers can be used in different layers to minimize the reflection. Typical examples are layers of $SiO_2$ and $TiO_2$. Examples of further suitable oxides include hafnium oxide ($HfO_2$), magnesium oxide (MgO), silicon monoxide (SiO), zirconium oxide ($ZrO_2$), and tantalum oxide ($Ta_2O_5$). It is additionally possible to use nitrides, such as $SiN_x$, for example. Moreover, fluorinated polymer can be used as a low refractive index layer. These layers are also used very frequently in combination with the aforementioned layers of $SiO_2$ and $TiO_2$. Furthermore, sol-gel processes can be employed. Here, for example, silicones, alkoxides and/or metal alkoxides are used in the form of mixtures, and coating takes place with these mixtures. Siloxanes, therefore, are also a widespread basis for reflection-reducing layers.

The typical coating thicknesses are between 2 Å and 1000 Å, preferably between 100 Å and 500 Å. In some cases, depending on layer thickness and chemical composition of the individual or two or more optical layers, color changes occur, which may in turn be controlled or modified through the thickness of the coating. For the siloxane process coated from solution it is also possible to obtain layer thicknesses of greater than 1000 Å.

A further possibility for reducing the reflection lies in the production of particular surface structures. Hence there is the possibility of porous coating and of the generation of stochastic or periodic surface structures. In this case the distance between the structures ought to be significantly smaller than the wavelength range of visible light.

Besides the aforementioned process of solvent coating, the optical layers may be applied by vacuum coating methods, such as CVD (chemical vapor depostion) or PIAD (plasma ion assisted deposition), for example.

Release Film

To protect the open (pressure-sensitive) adhesive it is preferably lined with one or more release films. As well as the release films it is also possible—albeit not very preferably—to use release papers, such as glassine, HDPE or LDPE release papers, for example, which in one embodiment have siliconization as a release layer.

It is preferred, however, to use a release film. In one very preferred embodiment the release film possesses siliconization as a release means. Furthermore, the film release liner ought to possess an extremely smooth surface, and so no structuring of the PSA is performed by the release liner. This is preferably achieved through the use of antiblocking-agent-free PET films in combination of silicone systems coated from solution.

Coating

The (pressure-sensitive) adhesives may be coated from solution or from the melt. For coating from solution, the (pressure-sensitive) adhesive is dissolved in typical solvents, such as toluene, benzine, isopropanol, etc., and then coated via a coating nozzle or a doctor knife. Particular preference is given to manufacturing the (pressure-sensitive) adhesives from solution, in order to prevent premature crosslinking. However, it is also possible to use all other coating methods which allow solvent-containing coatings.

Furthermore, coating may also take place from the melt. In this case, for example, the (pressure-sensitive) adhesive is blended in a compounder or twin-screw extruder, mixed with all of the components, and then coating using, for example, an extrusion die or a melt die.

Use

The above-described (pressure-sensitive) adhesives and (pressure-sensitive) adhesive tapes are suitable particularly for use in optical applications, where preferably permanent bonds are performed with residence times of greater than one month.

One particularly preferred field of use encompasses the adhesive bonding of touch panels and also the production of touch panels. FIG. 4 shows typical adhesive bonds in resistive touch panels. For this purpose it is preferred to use (pressure-sensitive) adhesive transfer tapes, i.e., tapes without carriers. Top film or reinforcement plate, however, may also be used and bonded in the form of a single-sided (pressure-sensitive) adhesive tape with the corresponding carrier.

FIG. 4 shows a touch panel 5 bonded by means of a first pressure-sensitive adhesive tape 1 to a substrate 6, which is a plastic plate or a glass plate, for example. Applied to the touch panel 5 by means of a second pressure-sensitive adhesive tape 1 is then a protective film or a cellphone window 7, which typically has an antiscratch coat.

FIG. 5 shows typical adhesive bonds for capacitive touch panels. For the bonding of structured ITO films 8, in particular, pressure-sensitive adhesive layers 2 with adhesive coat weights of greater than 50 $g/m^2$ are used, to provide for effective wetting of the structuring.

FIG. 5 additionally shows the bonding of a protective film or of a cellphone window 7, of a substrate 6 as rear reinforcement plate of a capacitive touch panel, and also of a display 9, with the PSA described. Both the PSA itself and the PSA in the form of an adhesive transfer tape may be used as a single-sided tape or else as a double-sided PSA tape with carrier film.

Test Methods

A. Refractive Index

The refractive index of the pressure-sensitive adhesive was measured in a film with a thickness of 25 μm, using the Optronic instrument from Krüss, at 25° C. with white light ($\lambda$=550 nm±150 nm) in accordance with the Abbe principle. For temperature stabilization, the instrument was operated in conjunction with a thermostat from Lauda.

B. Bond Strength

The peel strength (bond strength) was tested in accordance with PSTC-101. The adhesive tape is applied to a glass plate. A strip of the adhesive tape, 2 cm wide, is bonded by being rolled over back and forth three times with a 2 kg roller. The plate is clamped in, and the self-adhesive strip is peeled via its free end on a tensile testing machine at a peel angle of 180° and at a speed of 300 mm/min. The force is reported in N/cm.

C. Transmittance

The transmittance at 550 nm is determined in accordance with ASTM D1003. The specimen measured was the assembly made up of optically transparent PSA and glass plate.

D. Haze

The haze is determined in accordance with ASTM D 1003.

E. Light Stability

The assembly made up of PSA and glass plate, with a size of 4×20 $cm^2$, is irradiated for 250 hours using Osram Ultra Vitalux 300 W lamps at a distance of 50 cm. Following irradiation, the transmittance is determined by test method C.

F. Climatic Cycling Test

The PSA is adhered as a single-sided adhesive tape (50 $g/m^2$ coat weight, 50 μm PET film of type Mitsubishi RNK 50) to a glass plate, without air bubbles. The dimensions of the test strip are 2 cm width and 10 cm length. The bond strength to glass is determined by test method B.

In parallel, an adhesive assembly of this kind is placed in a climatic cycling cabinet and stored for 1000 cycles. One cycle includes:

storage at −40° C. for 30 minutes
heating to 85° C. within 5 minutes
storage at 85° C. for 30 minutes
cooling to −40° C. within 5 minutes After the climatic cycling test, the bond strength is determined again by test method B.

G. Electrical Conductivity Test

The PSA is adhered as a single-sided adhesive tape to an ITO film (Elecrysta®) from Nitto Denko. The dimensions of the ITO film are 12 cm×2 cm. The bond area is 10 cm×2 cm, and so 1 cm remains free for electrical measurements at each end. The assembly is subsequently stored in a climate cabinet for 500 hours at 85° C. and 20% humidity. The surface resistivity is then measured in accordance with DIN 53482. This is followed by a determination of the percentage drop in comparison to untreated ITO film.

EXAMPLES

Coating operations in the examples took place on a conventional laboratory coating unit for continuous coating. Coating was carried out in an ISO 5 clean room according to ISO standard 14644-1. The web width was 50 cm. The width of the coating gap was variably adjustable between 0 and 1 cm. The length of the heating tunnel was around 12 m. The temperature in the heating tunnel was divisible into four zones, and was freely selectable in each zone between room temperature and 120° C.

Production of the Specimens:

The constituents are dissolved in a mixture of toluene/benzine/isopropanol, 40:40:20 (figure in % by weight), giving a solids content of 40%. Shortly before coating, the metal chelate, dissolved at 10% in toluene, is then added and is distributed homogeneously by stirring. The specimens are then coated out onto a PET film 23 μm thick, and dried at 110° C., so as to leave a weight of adhesive per unit area of 50 g/m$^2$.

The precise composition of the examples is evident from table 1 below (figures in weight fractions).

TABLE 1

|  | 1 | 2 | 3 | Reference 4 |
|---|---|---|---|---|
| Kraton FG 1901 | 100 | 40 | 40 |  |
| Kraton FG 1924 |  | 60 | 60 |  |
| Kraton G 1652 |  |  |  | 100 |
| Regalite R 1100 | 100 | 100 |  | 100 |
| Escorez 5600 |  |  | 120 |  |
| Shellflex 371 | 20 | 20 |  | 20 |
| Kristalex 1140 |  | 10 |  |  |
| Aluminum acetylacetonate | 1 | 1 | 1 |  |

Properties of the Raw Materials Used:

Kraton® FG 1901 SEBS (styrene-ethylene/butylene-styrene block copolymer), 100% triblock, block polystyrene content: 30% by weight, modified with about 2% of maleic anhydride, Kraton Polymers Kraton® FG 1924 SEBS (styrene-ethylene/butylene-styrene block copolymer), around 41% by weight diblock, block polystyrene content: 13% by weight, modified with about 1.3% of maleic anhydride, Kraton Polymers Kraton® G 1652 SEBS (styrene-ethylene/butylene-styrene block copolymer), 100% triblock, block polystyrene content: 30% by weight, without acid modification, Kraton Polymers Regalite® R 1100 hydrogenated C9 resin having a softening point of around 100° C., Eastman Chemicals Escorez 5600® cycloaliphatic hydrogenated resin having a softening point of around 100° C.-106° C., ExxonMobil Chemical Shellflex® 371 naphthenic oil, Shell Kristalex® 1140 pure aromatic resin as end block reinforcer, with a softening point of around 140° C., Eastman Preparation of Reference Example 5:

The polymerization was carried out using monomers that had been purified of stabilizers. A 2 l glass reactor conventional for radical polymerizations was charged with 32 g of acrylic acid, 168 g of n-butyl acrylate, 200 g of 2-ethylhexyl acrylate and 300 g of acetone/isopropanol (97:3). After nitrogen gas had been passed through the reactor for 45 minutes, with stirring, the reactor was heated to 58° C. and 0.2 g of Vazo67® (DuPont, 2,2'-azodi(2-methylbutyronitrile)) was added. The external heating bath was then heated to 75° C. and the reaction was carried out constantly at this external temperature. After a reaction time of 1 hour a further 0.2 g of Vazo 67® (DuPont, 2,2'-azodi(2-methylbutyronitrile)) was added. After 3 hours and after 6 hours, the batch was diluted with 150 g each time of acetone/isopropanol mixture. In order to reduce the residual initiators, 0.1 g each time of Perkadox 16® (from Akzo Nobel, di(4-tert-butylcyclohexyl) peroxydicarbonate) was added after 8 hours and after 10 hours. After a reaction time of 22 hours, the reaction was discontinued and the batch was cooled to room temperature. This was followed by dilution with isopropanol to a solids content of 30%, and by the addition, with vigorous stirring, of 0.3% by weight of aluminum acetylacetonate. The solution was then coated out onto a release film in the same way as in examples 1-3, and dried at 120° C. for 10 minutes. The coat weight was 50 g/m$^2$.

Results

Following production of the test specimens, the refractive index was determined by test method A to start with of all inventive and comparative examples. The results are summarized in table 2.

TABLE 2

| Example | Refractive index (Test A) |
|---|---|
| 1 | 1.54 |
| 2 | 1.56 |
| 3 | 1.55 |
| Reference 4 (R4) | 1.54 |
| Reference 5 (R5) | 1.47 |

From the values measured it is evident that examples 1-3 have achieved the target range for the refractive index, of greater than 1.49. Depending on the aromatic hard block fraction, the values range between 1.54 and 1.56. The reference specimen based on unmodified block copolymers, reference 4, likewise shows a relatively high refractive index of 1.54. The polyacrylate-based reference example R5, on the other hand, has a significantly reduced refractive index of 1.47.

In the following step, the instantaneous bond strengths to glass of all of the inventive and reference examples were ascertained. Measurement in this case took place at a 180° angle. The results are set out in table 3 below.

TABLE 3

| Example | Bond strength (Test B) |
|---|---|
| 1 | 3.9 N/cm |
| 2 | 5.3 N/cm |
| 3 | 4.4 N/cm |
| Reference 4 (R4) | 4.2 N/cm |
| Reference 5 (R5) | 6.4 N/cm |

From table 3 it is evident that all of examples 1-3 are suitable for permanent adhesive bonding. Reference examples R4 and R5 likewise show very high instantaneous bond strengths to glass.

For further optical determination, measurements of transmittance and of haze were conducted on all of the inventive examples and comparative examples. The results are listed in table 4.

TABLE 4

| Example | Transmittance (test C) | Haze (test D) |
|---|---|---|
| 1 | 92% | 0.4% |
| 2 | 92% | 0.7% |
| 3 | 92% | 0.4% |
| R 4 | 92% | 0.5% |
| R 5 | 93% | 0.4% |

From table 4 it is apparent that all of the examples have a water-clear transparency and hence also a high transmittance. In the measurement, the transmittance is limited at around 92% to 93%, in each case as a result of reflection losses because of the transition from air to the adhesive. These results are confirmed once again by the haze value measurements. Here again, haze values below 1% were measured in all cases.

Subsequently, furthermore, various aging investigations were carried out. First, a light stability test was carried out by test method E. This test examines whether long sunlight irradiation causes a discoloration or yellowing. This is particularly important for optical applications which are subject to long-term irradiation, such as by a display, for example, or are used in the exterior sector. The results are summarized in table 5.

TABLE 5

| Example | Transmittance after light stability test (Test E) |
|---|---|
| 1 | 89% |
| 2 | 90% |
| 3 | 90% |
| R 4 | 89% |
| R 5 | 91% |

From table 5 it is apparent that all of the inventive and reference examples have a stable transmittance and there is very little drop, or none at all, in the transmittance after the light stability test.

A further aging test includes climatic cycling. Here, the exposure of the adhesive to very different climatic conditions is simulated, as may be the case, for example, for end applications in the cellphone segment. The alternating climate test was carried out by test method F. The results are set out in table 6.

TABLE 6

| Example | Bond strength after climatic cycling storage (Test F) |
|---|---|
| 1 | 4.3 N/cm |
| 2 | 5.0 N/cm |
| 3 | 4.2 N/cm |
| R 4 | 1.2 N/cm* |
| R 5 | 6.9 N/cm |

*example fractures cohesively in the bond strength test

The measurements from table 6 make it clear that comparative example R 4 exhibits very low bonding strengths. The composition did not withstand intact the temperature loading in the climatic cycling test, and is therefore not suitable for use in the consumer electronics segment. The rest of the examples, in contrast, exhibit stable bond strength performance.

As a final measurement, a loss of surface conductivity over a prolonged time period was once again measured for all of the inventive and comparative examples. This test simulates whether aging effects occur that adversely influence the electrical conductivity. The loss (in percent) is determined by comparing a measurement on the assembly before and after storage (measurement method G). For touch panel applications, losses of less than 5% are necessary in order to establish a good candidacy. The results relating to these investigations are summarized in table 7.

TABLE 7

| Example | Surface conductivity loss in [%] (Test G) |
|---|---|
| 1 | 3.9 |
| 2 | 4.6 |
| 3 | 4.0 |
| R 4 | 4.2 |
| R 5 | 15.4 |

The results of measurement show that comparative example R 5 exhibits a significant drop in electrical conductivity. Reference example 5 is based on a polyacrylate and contains acrylic acid groups. Examples 1 to 3, in contrast, and also reference example 4, exhibit only a very small loss in surface conductivity.

In summary, the results of measurement show that only very specific pressure-sensitive adhesives with very defined adhesive formulations are able to meet all of the requirements. Examples 1-3 are therefore very highly suitable for use for optical applications. Typical applications are the bonding of touch panels or the bonding of ITO films for capacitive touch panels.

The invention claimed is:

1. A method of bonding optical components, the method comprising:
bonding a first optical component to a second optical component with an adhesive, wherein the adhesive comprises at least an acid anhydride-modified vinylaromatic block copolymer, a metal chelate, and a tackifier resin, wherein the adhesive has a transmittance of greater than 86% and a haze of less than 5%, wherein a fraction of the metal chelate in the adhesive is 0.01% to 2% by weight, based on the overall adhesive.

2. The method according to claim 1, wherein the adhesive is a pressure-sensitive adhesive.

3. The method according to claim 1, wherein the metal chelate conforms to the following formula:

$$(R_1O)_nM(XR_2Y)_m$$

where M is a metal,
$R_1$ is an alkyl or aryl group, more particularly methyl, ethyl, butyl, isopropyl or benzyl,
n is zero or an integer greater than zero (n≥0),
X is oxygen or nitrogen,
Y is oxygen or nitrogen,
where X=Y is also possible and
where X and/or Y may be bonded to $R_2$ by a double bond;
$R_2$ is an alkylene group joining X and Y,
where the alkylene group may be branched, or else may contain oxygen and/or further heteroatoms in the chain;
m is an integer, but is at least 1 (m≥1).

4. The method according to claim 3, wherein the metal of the metal chelate is selected from main groups 2, 3, 4, and 5 of the Periodic Table and also the transition metals.

5. The adhesive according to claim 4, wherein the metal of the metal chelate is aluminum.

6. The method according to claim 1, wherein the acid anhydride-modified vinylaromatic block copolymer is a block copolymer formed of vinylaromatic (A blocks) and those formed by polymerization of 1,3-dienes (B blocks).

7. The method according to claim 1, wherein the adhesive has a fraction of at least 20% by weight of vinylaromatic block copolymer, and in that the same has a fraction of not more than 70% by weight of vinylaromatic block copolymer.

8. The method according to claim 1, wherein a fraction of acid anhydride is between 0.5% and 4% by weight, based on the overall block copolymer.

9. The method according to claim 1, wherein the adhesive has a pH in a range from 6 to 8.

10. The method according to claim 1, wherein the adhesive has a fraction of at least 30% by weight of vinylaromatic block copolymer, and in that the same has a fraction of not more than 60% by weight of vinylaromatic block copolymer.

11. The method according to claim 1, wherein the adhesive has a fraction of at least 35% by weight of vinylaromatic block copolymer, and in that the same has a fraction of not more than 55% by weight of vinylaromatic block copolymer.

12. The method according to claim 1, wherein the adhesive has a fraction of at least 20% by weight of vinylaromatic block copolymer, or has a fraction of not more than 70% by weight of vinylaromatic block copolymer.

13. The method according to claim 1, wherein the adhesive has a fraction of at least 30% by weight of vinylaromatic block copolymer, or has a fraction of not more than 60% by weight of vinylaromatic block copolymer.

14. The method according to claim 1, wherein the adhesive has a fraction of at least 35% by weight of vinylaromatic block copolymer, or has a fraction of not more than 55% by weight of vinylaromatic block copolymer.

15. The method according to claim 1, wherein at least one of the first and second optical components is an optical film.

16. The method according to claim 1, wherein at least one of the first and second optical components is an indium tin oxide film.

17. The method according to claim 1, wherein the fraction of the metal chelate in the adhesive is about 0.5% or less by weight, based on the overall adhesive.

18. A method of bonding optical components, the method comprising:
bonding an adhesive to at least one optical component, wherein the at least one optical component is a resistive touch panel, wherein the adhesive comprises at least an acid anhydride-modified vinylaromatic block copolymer, a metal chelate, and a tackifier resin, and further wherein the adhesive has a transmittance of greater than 86% and a haze of less than 5%.

19. A method of bonding optical components, the method comprising:
bonding an adhesive to at least one optical component, wherein the at least one optical component is at least one optical film, wherein the adhesive comprises at least an acid anhydride-modified vinylaromatic block copolymer, a metal chelate, and a tackifier resin, and further wherein the adhesive has a transmittance of greater than 86% and a haze of less than 5%.

20. The method according to claim 1, wherein the adhesive full-area bonds the optical components.

* * * * *